United States Patent [19]

Gallus

[11] Patent Number: 4,674,572
[45] Date of Patent: Jun. 23, 1987

[54] CORROSION AND EROSION-RESISTANT WELLHOUSING

[75] Inventor: Julius P. Gallus, Anaheim, Calif.

[73] Assignee: Union Oil Company of California, Los Angeles, Calif.

[21] Appl. No.: 817,353

[22] Filed: Jan. 9, 1986

Related U.S. Application Data

[63] Continuation-in-part of Ser. No. 658,261, Oct. 4, 1984, abandoned.

[51] Int. Cl.$^4$ .................. E21B 33/14; E21B 41/02
[52] U.S. Cl. ..................................... 166/285; 166/369; 166/376; 166/292; 166/902
[58] Field of Search .............. 166/57, 242, 243, 285, 166/287, 369–372, 376, 292, 901, 902

[56] References Cited

U.S. PATENT DOCUMENTS

| | | | |
|---|---|---|---|
| 1,485,512 | 3/1924 | Cocq et al. | 166/242 X |
| 2,164,266 | 6/1939 | Armentrout et al. | 166/285 |
| 2,436,198 | 2/1948 | Cardwell et al. | 166/376 X |
| 3,375,873 | 4/1968 | Mitchell | 166/293 |
| 3,531,236 | 9/1970 | Braddick et al. | 166/57 X |
| 3,695,358 | 10/1972 | Blount et al. | 166/57 X |
| 3,804,058 | 4/1974 | Messenger | 166/292 |
| 3,876,004 | 4/1975 | Bell et al. | 166/285 |
| 3,902,911 | 9/1975 | Messenger | 106/97 |
| 4,069,870 | 1/1978 | Gallus | 166/293 |
| 4,114,692 | 9/1978 | Gallus | 166/293 |
| 4,200,153 | 4/1980 | Gallus | 166/292 |
| 4,234,344 | 11/1980 | Tinsley | 106/88 |
| 4,444,263 | 4/1984 | Ploeg et al. | 166/901 |

FOREIGN PATENT DOCUMENTS

| | | | |
|---|---|---|---|
| 957613 | 11/1974 | Canada | 166/242 |
| 968700 | 6/1975 | Canada | 166/242 |

OTHER PUBLICATIONS

"Corrosion of Metals by Geothermal Fluids in Taiwan's Tatun Volcanic Region and Novel Approaches for Controlling the Problem", by P. P. Cherng and J. R. Wang in *Proceedings of the International Symposium on Solving Corrosion and Scaling Problems in Geothermal Systems*, Symposium held Jan. 17–20, 1983, pp. 285–293.

*Primary Examiner*—George A. Suchfield
*Attorney, Agent, or Firm*—Dean Sandford; Gregory F. Wirzbicki; June M. Bostich

[57] ABSTRACT

Corrosion and erosion of metal well casings due to production of corrosive well fluids, especially geothermal brines, is avoided by producing corrosive fluids through an impermeable cement wellhousing comprised of inner and outer substantially continuous cement liners which envelop and insulate from corrosion and erosion a conventional outer metal or other well casing while the outer casing internally reinforces the cement well housing. A second, sacrificial metal casing of smaller diameter is used in cementing the inner cement liner and can be substantially corroded away by corrosive fluids without substantial damage to the remaining cement wellhousing or outer casing through which corrosive fluids are produced. An apparatus for producing corrosive fluids, particularly geothermal brine, contained in a subterranean formation is also disclosed.

56 Claims, 1 Drawing Figure

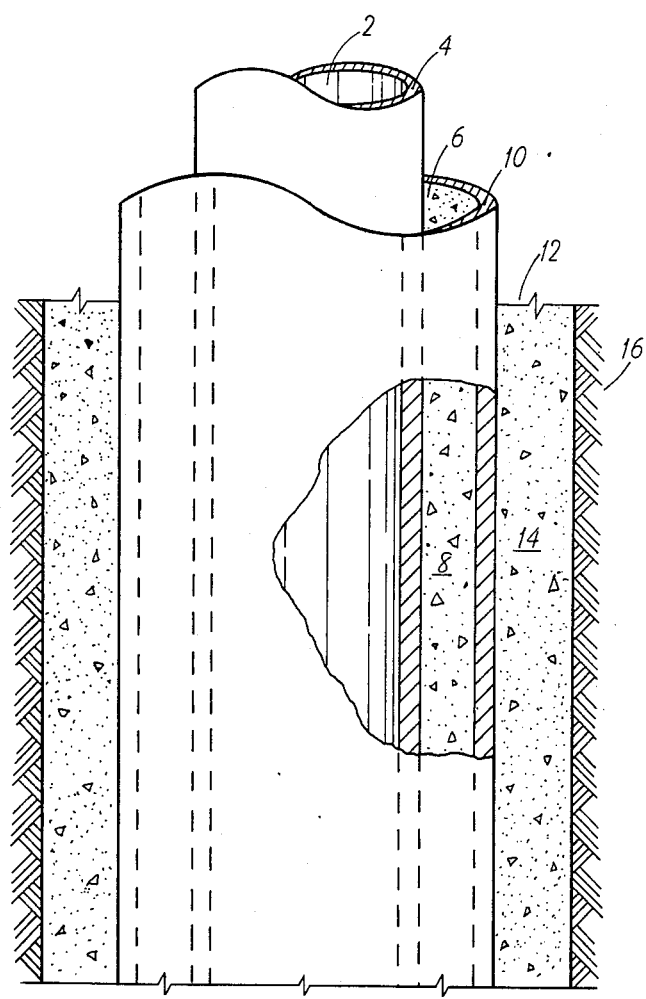

CORROSION AND EROSION-RESISTANT WELLHOUSING

CROSS-REFERENCE TO RELATED APPLICATIONS

This application is a continuation-in-part of U.S. patent application Ser. No. 658,261 filed Oct. 4, 1984, now abandoned.

BACKGROUND OF THE INVENTION

This invention relates to methods for cementing wells penetrating permeable, fluid-containing strata. More particularly, this invention relates to methods for cementing a wellbore that penetrates permeable strata which contain corrosive fluids so as to prevent casing corrosion and erosion by contact with formation fluids and well additives.

In the drilling of wells, for example oil wells, wells penetrating sources of geothermal energy, and the like, it is common practice to use a cement to hold a well casing in place and to selectively block or plug strata penetrated by the well to prevent loss of drilling muds and fluids. The cement, when so used, is pumped as a slurry into the annular space between the bore of the well and the casing and then is permitted to cure into an impermeable hardened mass.

To resist the temperatures and pressures encountered in wells, cements have been developed to provide maximum compressive strength and resistance to thermal degradation. Usually the cements are conventional Portland-type cements to which have been added any of a number of additives such as mica, blast furnace slag, alumina or special reactive sands designed to improve the mechanical strength and the thermal or chemical resistance of the set and hardened cement. However satisfactory these cements have proven for conventional well operations, in geothermal wells where temperatures in excess of 400° F. may be encountered, they have quickly deteriorated, suffering increased porosity, permeability, and loss of compressive strength sufficient to lead to blowouts.

Accordingly, oil well cements used in geothermal wells, or in oil wells having a depth on the order of about 100 to 20,000 feet or more, are desired which maintain adequate compressive strength and density, but low permeability even at high temperature and pressure and despite contact with steam, strong brines or other corrosive substances. To meet these requirements, U.S. Pat. No. 4,069,870 to Gallus (herein incorporated by reference in its entirety) discloses addition of not more than 15 weight percent of a carbon-containing substance having a low content of volatile materials, such as lower boiling gases and liquids given off by the carbon-containing additive upon heating. Materials vaporized by the high temperatures encountered in the wellbore can disrupt the structure of the cement and thereby offset any benefits provided by the carbon-containing additive. Anthracite, calcined coke, green coke and oil shale are suitable carbon-containing materials for use in this invention.

In U.S. Pat. No. 4,114,692 to Gallus (herein incorporated by reference in its entirety) a method of introducing the carbon-containing cement into a confined annular space between the casing and the walls of the bore hole is disclosed.

To control the expense in high temperature wells of cement containing carbon additives, U.S. Pat. No. 4,200,153 to Gallus (herein incorporated by reference in its entirety) provides a method for cementing a high temperature well in which a hardenable slurry formed by admixing a carbon black additive into a conventional Portland cement in an amount between 0.01 and 1.0 weight percent is introduced into a confined space in fluid communication with a well, usually the annular space between the casing and the walls of the bore hole. Addition of such small amounts of carbon black to an oil well cement consisting of API class G or J cement is effective to impart, at minimal cost, an ultimate compressive strength of at least about 1,000 p.s.i. and an ultimate permeability less than about one millidarcy.

The lithological conditions which are compatible with the subterranean high temperatures characteristic of geothermal well sites are often weak, incompetent, or permeated by extensive fractures. For this reason, during placement of cement liners lost circulation of cement is common. Additives which increase thermal stability and compressive strength or decrease permeability of cements used in geothermal wells, such as carbon-containing additives, also increase the density of the cement, an effect which substantially contributes to the loss of cement into cracks and highly permeable zones of the formation. To overcome this disadvantage and reduce the hydrostatic pressure in the well bore during cementing, a light weight cement of high strength and thermal resistance is needed. A decrease in density has been achieved by adding such low density materials as bentonite, diatomaceous earth, and perlite. In U.S. Pat. Nos. 3,804,058 and 3,902,911 issued to Messenger, light-weight cements are made by introducing small, sealed glass or ceramic spheres as a substantial component of the cement. Although of relatively low density, these cements have relatively high water contents and relatively low compressive strengths, which generally do not exceed about 600 p.s.i.

Tinsley, in U.S. Pat. No. 4,234,344, (herein incorporated by reference in its entirety) overcomes these disadvantages by disclosing a low density cement for use in high temperature environments comprising a fine particulate crystalline silica, such as silica flour, having a particle size of less than about 10 mesh, and a light weight inorganic material, such as dispersed, stabilized gases having relatively low solubility in water—among others, hydrogen, air, oxygen and the noble gases—or an inorganic, particulate siliceous component stable at high temperature —such as sealed hollow spheres, beads of glass, and ceramic, or beads of fly ash materials. The silica and inorganic material impart thermal stability and permanent strength to the cement and reduce ultimate density or weight without sacrifice of strength.

A related problem in the cementing of high temperature geothermal wells is the premature setting of the cement. U.S. Pat. No. 3,375,873 to Mitchell (herein incorporated by reference in its entirety) solves this problem by adding ferrochrome lignosulfate to the cement slurry in an amount sufficient to prevent loss of pumpability and premature setting, usually at least 5 percent by weight of the dry Portland cement employed.

Despite these improvements in the techniques for cementing wells in highly corrosive environments, such as geothermal wells, the metal casings customarily used with cement liners are subject to severe corrosion and erosion, even when highly corrosion-resistant alloys are used. What is particularly needed is a method of cementing high temperature wells, particularly geothermal wells and wells containing high levels of hydrogen sulfide or other sulfurous compounds, so that the metal casing, which customarily serves as a conduit through which fluids are removed from the well, is protected from the corrosive and erosive action of the fluids removed from or added to the well.

SUMMARY OF THE INVENTION

A well housing is cemented into a subterranean formation penetrated by a wellbore by a method of (a) positioning an outer well casing into the wellbore so that a first annulus is formed between the surface of the wellbore and the outer well casing; (b) filling the first annulus with a hardenable cement slurry; (c) allowing the cement slurry to harden in the first annulus to form a substantially impermeable, substantially continuous outer cement liner lying along the outer surface of the outer well casing; (d) positioning an inner well casing into the wellbore so that a second annulus is formed between the outer surface of the inner well casing and the inner surface of the outer well casing; (e) filling the second annulus with a hardenable cement slurry; (f) allowing the cement slurry in the second annulus to harden to form a substantially impermeable, substantially continuous inner cement liner, the outer surface of the inner liner lying along the inner surface of the outer well casing.

An apparatus for producing fluids from a wellbore penetrating a subterranean formation is also disclosed, which apparatus comprises (a) a well casing positioned within the wellbore; (b) a first cement liner comprised of a hardened, substantially impermeable layer of substantially continuous cement lying along the outer surface of the metal casing; and (c) a second cement liner comprised of a hardened, substantially impermeable layer of substantially continuous cement lying along the inner surface of the metal casing.

BRIEF DESCRIPTION OF THE DRAWING

The present invention will be more readily understood by reference to the drawing, which depicts a vertical cut-away view of a well penetrating a producing subterranean formation.

DETAILED DESCRIPTION OF THE INVENTION

With reference now to the drawing, into subterranean formation 16 is placed a well housing which consists of inner and outer metal well casings 4 and 10 respectively, casings 4 and 10 being preferably of equal length with the outer well casing being lined both internally and externally with substantially continuous layers of temperature-resistant and substantially impermeable cement. The inner and outer layers of cement are cement liner 8 and cement liner 14 respectively, which are also preferably of substantially equal length. Cement liners 8 and 14 protect outer casing 10 from corrosion and erosion by isolating it from contact by reservoir fluids and additives.

However, since reservoir fluids are produced through borehole 2, an inner casing 4 may, depending on its composition, undergo extensive corrosion and erosion in a high temperature corrosive environment as is found in geothermal wells or in wells containing high levels of hydrogen sulfide or other sulfurous compounds. In this invention, inner casing 4 is usually and preferably a temporary "sacrificial" casing useful in cementing the wellbore. It can be made of an inexpensive metal corrodible by prolonged contact with well fluids and/or well treating additives. When during the course of production inner casing 4 is substantially completely corroded and/or eroded away by the fluids produced through borehole 2, fluids will continue to be produced through the remaining cement well housing comprised of cement liners 8 and 14, which enclose and receive internal support and reinforcement by outer casing 10.

More particularly, this invention comprises a method for cementing a well-housing into a wellbore penetrating a subterranean formation containing corrosive liquids, such as a geothermal formation containing steam and highly corrosive brines. In the practice of this invention a borehole is first made into subterranean formation 16 using the drilling techniques best suited to the formation at hand. Next, annular space 12, into which outer cement layer 14 is to be placed, is prepared by positioning outer casing 10 within the borehole, preferably in a concentric fashion. Typically, the diameter of the wellbore drilled into formation 16 is between 18 and 36 inches and outer casing 10 is a conventional metal well casing having an external diameter between 15 and 30 inches. The radial thickness of annulus 12, is generally between about $\frac{1}{2}$ and 6 inches. In the preferred embodiment, the diameter of the wellbore is between about 20 and 24 inches, and outer casing 10 is a conventional tubular metal casing of between about 15 and 18 inches external diameter. The preferred radial thickness of outer cement liner 14 is between about $\frac{3}{4}$ and $2\frac{1}{2}$ inches, most preferably about $1\frac{1}{2}$ to 2 inches. Typically, the well housing comprising the cement liners and well casings extends into the well bore penetrating the subterranean formation to a depth of between about 100 and 20,000 feet.

To form cement liner 14, a slurry of thermally resistant, substantially impermeable cement is injected into annular space 12 so as to completely cover the outer surface of casing 10 and is allowed to harden. Typically the cement slurry is injected down the bore of outer casing 10 at a pressure sufficient to force the cement slurry upwards so as to substantially fill annular space 12, after which the cement is allowed to harden and form substantially continuous cement liner 14.

Annular space 6, into which inner cement layer 8 is to be placed, is next prepared by positioning inner tubular metal casing 4 within the bore of metal casing 10, preferably in concentric fashion. The outer surface of inner casing 4 serves as the inner surface of annulus 6, the outer surface of annulus 6 being defined by the inner surface of casing 10. Since inner casing 4 must have sufficient initial strength to withstand the pressure exerted by a cement slurry delivered into annulus 6 to form cement liner 8, casing 4 is preferably composed of any readily corrodible material having sufficient initial strength to withstand the hydrostatic pressure exerted by a column of cement slurry pumped into annulus 6. Typically casing 4 is a conventional tubular metal well casing having an external diameter between about 4 and 20 inches. Preferably the external diameter of inner casing 4 is between about $9\frac{5}{8}$ and $13\frac{3}{8}$ inches. The radial thickness of cement liner 8 is generally between about $\frac{1}{2}$ and 6 inches, and preferably between about $\frac{3}{4}$ and $2\frac{1}{2}$ inches, most preferably about $1\frac{1}{2}$ to 2 inches.

To form cement liner 8, a slurry of the hardenable thermally-resistant cement is pumped into annulus 6 so as to completely cover the inner surface of liner 10 with a competent layer of cement. Typically the slurry of cement is injected down bore 2 of casing 4 at a pressure sufficient to force the cement slurry upwards so as to substantially fill annular space 6 where it is allowed to harden into substantially continuous cement liner 8.

To ensure that the cement well housing adequately protects well casing 10, cement liners 8 and 14 are usually composed of any thermally resistant cement that provides high compressive strength and maintains low porosity despite contact with steam, strong brines, or other substances which tend to degrade cements in a harsh well bore environment. Preferably cement layers 8 and 14 are composed of API Class G or J cements which contain between about 40 and 80 percent of silica flour and which have an ultimate compressive strength of at least about 1,000 p.s.i. and permeability less than about one millidarcy. The preferred particle size of the silica flour is less than 10 mesh. In addition, cement liners 8 and 14 are substantially continuous to provide no avenues for penetration of corrosive fluids from the well bore or the formation to outer metal casing 10.

To obtain production of fluids from the subterranean formation, the well housing can be perforated or treated using the customary techniques known in the art. Even if "sacrificial" inner metal casing 4 is substantially corroded away, production of corrosive fluids continues without need for shutdown to replace the deteriorated casing.

Under these conditions fluids are introduced into or produced from the reservoir through the bore of cement liner 8, which forms the inner surface of a cement "casing" or well housing. Although located within a corrosive well environment, casing 10 is protected from corrosion by being substantially completely enclosed within a continuous envelope of thermally resistant, impermeable cement. Cement liner 8 therefore serves the secondary purpose of covering and protecting the inner surface of casing 10 against corrosive attack by fluids entering or exiting through the well housing penetrating through cement liner 8. In similar manner, the outer surface of casing 10, which is completely covered by cement liner 14, is protected from corrosive attack by fluids that may seep into the wellbore from formation 16.

Since a thermally resistant cement of low porosity and permeability and high compressive strength is preferably used in the formation of cement liners 8 and 14, a well housing made in accordance with the preferred embodiment is more durable in highly corrosive well environments than conventional metal casings made of most corrosion-resistant alloys and cemented using the best techniques presently known in the art.

Moreover, the well-housing of this invention provides the particular advantage of low cost. No highly corrosion-resistant, costly metals are employed in metal casings 4 and 10, and, in fact, sacrificial casing 4 is preferably made of an inexpensive and corrodible material having the initial properties necessary to withstand the process of cementing the liners. The expense of the materials necessary to fabricate the well housing of this invention, therefore, is greatly reduced over that required to place a conventional high alloy metal casing into a producing formation which contains corrosive fluids.

Yet another advantage of this invention lies in the fact that in a harshly corrosive well environment, such as a geothermal well containing strong brine, the cement casing remaining after casing 4 has been substantially corroded away will remain in service long after most expensive metal alloy casings would have sufficiently corroded and eroded to demand repair or replacement. Additional substantial savings in costly down time, therefore, can be effected by using the well cementing method of this invention.

Still another advantage of this invention is that, should the inner cement liner become damaged, cracked, or otherwise suffer imperfections once the inner casing has been substantially corroded away, the liner can be easily drilled out at little cost, another sacrificial casing can be positioned within the well bore, and a new inner cement liner can be pumped into the annulus and allowed to harden. Thus, the inner cement liner is easily replaceable if the need arises.

While particular embodiments of the invention have been described, it will be understood that the invention is not limited thereto since many obvious modifications can be made. It is intended to include within this invention any such modification as will fall within the scope of the appended claims.

I claim:

1. A process for cementing a well housing in a subterranean formation penetrated by a wellbore, the process comprising:
   (a) positioning an outer well casing into said wellbore so that a first annulus is formed between the inner surface of the wellbore and the outer surface of the outer well casing;
   (b) filling the first annulus with a hardenable cement slurry;
   (c) allowing the slurry to harden and form in the first annulus a substantially continuous outer cement liner of permeability less than about 1 millidarcy, the inner surface of the outer liner lying along the outer surface of the outer well casing;
   (d) positioning an inner well casing into the wellbore so that a second annulus is formed between the outer surface of the inner well casing and the inner surface of the outer well casing;
   (e) filling the second annulus with a hardenable cement slurry; and
   (f) allowing the slurry in the second annulus to harden and form a substantially continuous cement liner of permeability less than about 1 millidarcy, the outer surface of the inner liner lying along the inner surface of the outer well casing.

2. The process defined in claim 1 wherein the outer liner completely covers the outer surface of the outer well casing and the inner liner completely covers the inner surface of the outer well casing.

3. The process defined in claim 2 wherein the cement in steps (b) and (e), after hardening in steps (c) and (f) respectively, is thermally stable.

4. The process defined in claim 1, 2, or 3 wherein the cement in steps (b) and (e), after hardening in steps (c) and (f), respectively, has an ultimate compressive strength of at least about 1,000 p.s.i.g.

5. The process defined in claim 1, 2, or 3 wherein the cement in steps (b) and (e), after hardening in steps (e) and (f), respectively, comprises an API class G or J cement containing between about 40 and 80 percent of silica flour.

6. The process defined in claim 5 wherein the silica flour has a particle size less than about 10 mesh.

7. A process for cementing a well housing in a subterranean formation containing corrosive geothermal brines penetrated by a wellbore, the process comprising:
  (a) positioning an outer well casing into said wellbore so that a first annulus is formed between the inner surface of the wellbore and the outer surface of the outer well casing;
  (b) filling the first annulus with a hardenable cement slurry;
  (c) allowing the slurry to harden and form in the first annulus an outer cement liner substantially continuous and impermeable to said corrosive geothermal brines;
  (d) positioning an inner well casing into the wellbore so that a second annulus is formed between the outer surface of the inner well casing and the inner surface of the outer well casing;
  (e) filling the second annulus with a hardenable cement slurry; and
  (f) allowing the slurry in the second annulus to harden and form a cement liner substantially continuous and impermeable to the corrosive geothermal brine.

8. The process of claim 7 wherein the geothermal brine is produced through the inner casing until the inner casing is substantially corroded away without substantial corrosion to the outer casing.

9. The process of claim 2 wherein the subterranean formation contains corrosive fluids.

10. The process of claim 9 wherein the corrosive fluids are produced through the inner casing until the inner casing is substantially corroded away without substantial corrosion to the outer casing.

11. A method for producing geothermal brine wherein the geothermal brine is produced through a well cemented by the method of claim 1 or 7.

12. A process for cementing a corrosion-resistant wellhousing in a subterranean formation which contains corrosive fluids, the process comprising:
  (a) drilling a wellbore into the formation;
  (b) positioning within the wellbore an outer metal well casing so that a first annulus is formed between the inner surface of the wellbore and the outer surface of the outer well casing;
  (c) filling the first annulus with a hardenable cement slurry;
  (d) allowing the slurry to harden into a substantially continuous, impermeable, thermally stable outer liner of cement in the first annulus, the inner surface of the outer liner lying along the outer surface of the outer well casing so as to form a substantially impermeable barrier to the corrosive fluids of the subterranean formation;
  (e) positioning an inner metal well casing into the wellbore, the inner well casing having a diameter smaller than the diameter of the outer well casing so that a second annulus is formed between the outer surface of the inner well casing and the inner surface of the outer well casing;
  (f) filling the second annulus with a hardenable cement slurry;
  (g) allowing the slurry in the second annulus to harden into a substantially continuous, substantially impermeable inner cement liner, the outer surface of the inner liner lying along the inner surface of the outer well casing so as to form a substantially impermeable barrier to the corrosive fluids of the subterranean formation; and
  (h) producing well fluids comprising the corrosive fluids through the inner metal casing until the inner metal casing is substantially corroded away without substantial corrosion to the outer casing.

13. The process defined in claim 12 wherein the hardened cements in steps (d) and (g) are thermally stable.

14. The process defined in claim 12 or 13 wherein the hardened cements in steps (d) and (g) have an ultimate compressive strength of at least about 1000 p.s.i.g. and permeability less than about one millidarcy.

15. The process defined in claim 12 wherein the lengths of the inner well casing and the outer well casing are substantially equal.

16. The process defined in claim 12 wherein the lengths of the inner and outer cement liners are substantially equal.

17. The process defined in claim 12 wherein the hardened cements in steps (d) and (g) comprise an API class G or J cement containing between 40 and 80 percent of silica flour.

18. The process defined in claim 17 wherein the silica flour has a particle size less than about 10 mesh.

19. The process defined in claim 12 wherein the inner metal casing comprises a readily corrodible metal.

20. The process defined in claim 12 wherein the diameter of the wellbore is between about 18 and 36 inches, the external diameter of the outer metal casing is between about 15 and 30 inches, the external diameter of the inner metal casing is between about 4 and 20 inches, and the thickness of the inner and outer cement liners is between about $\frac{1}{2}$ and 6 inches.

21. The process defined in claim 12 wherein the diameter of the wellbore is between about 20 and 24 inches, the external diameter of the outer metal casing is between about 15 and 18 inches, the external diameter of the inner metal casing is between about $9\frac{5}{8}$ and $13\frac{3}{8}$ inches, and the thickness of the inner and outer cement liners is between about $\frac{3}{4}$ and $2\frac{1}{2}$ inches.

22. The process of claim 12 wherein the subterranean formation is a geothermal formation and the corrosive fluids are geothermal brines.

23. A process for producing geothermal brine wherein the geothermal brine is produced through a well housing cemented by the method of claim 12.

24. An apparatus for producing corrosive fluids contained in a subterranean formation wherein the apparatus is made by the process defined in claim 1 or 7.

25. An apparatus for producing geothermal brine contained in a subterranean formation wherein the apparatus is made by the process defined in claim 12.

26. An apparatus for producing fluids from a wellbore penetrating a subterranean formation wherein the apparatus comprises:
  (a) a metal casing positioned within the wellbore;
  (b) a first cement liner comprised of a hardened, substantially continuous layer of cement having permeability of not more than about 1 millidarcy, which first cement liner lies along the outer surface of the metal casing; and
  (c) a second cement liner comprised of a hardened, substantially continuous layer of cement having permeability of not more than about 1 millidarcy, which second cement liner lies along the inner surface of the metal casing.

27. The apparatus defined in claim 26 wherein each cement liner comprises a thermally stable cement.

28. The apparatus claimed in claim 26 wherein the first cement liner completely covers the outer surface of the metal casing and the second cement liner completely covers the inner surface of the metal casing.

29. The apparatus claimed in claim 28 wherein the cement liners have an ultimate compressive strength of at least about 1,000 p.s.i.g.

30. The apparatus defined in claim 27 wherein the cement liners contain between about 40 and 80 percent of silica flour.

31. The apparatus defined in claim 30 wherein the diameter of the wellbore is between about 18 and 36 inches, the external diameter of the metal casing is between about 15 and 30 inches, and the thickness of the inner and outer cement liners is between about ½ and 6 inches.

32. The apparatus defined in claim 26 wherein the diameter of the wellbore is between about 20 and 24 inches, the external diameter of the metal casing is between about 15 and 18 inches, and the thickness of the inner and outer cement liners is between about ¾ and 2½ inches.

33. An apparatus for producing geothermal fluids from a wellbore penetrating a subterranean formation wherein the apparatus comprises:
   (a) a metal casing positioned within the wellbore;
   (b) a first substantially continuous cement liner comprised of a hardened layer of cement substantially impermeable to the geothermal fluids positioned between the metal casing and the wellbore; and
   (c) a second substantially continuous cement liner comprised of a hardened layer of cement substantially impermeable to the geothermal fluids is positioned within the metal casing with the outside surface of the second cement liner in contact with the inside surface of the metal casing.

34. The apparatus defined in claim 33 which apparatus further comprises a second well casing positioned within the bore of the second cement liner with the outside surface of the second well casing lying along the inside surface of the second cement liner.

35. The apparatus defined in claim 34 wherein the first and second well casings are of substantially equal thickness.

36. An apparatus for producing corrosive fluids from a wellbore penetrating a subterranean formation containing corrosive fluids wherein the apparatus comprises:
   (a) an outer well casing positioned within the wellbore;
   (b) a first cement liner comprised of a hardened substantially continuous layer of cement substantially impermeable to said corrosive fluids, which first cement liner lies along the outer surface of the outer well casing;
   (c) an inner well casing positioned within the wellbore and further within the bore of the outer well casing located therein; and
   (d) a second cement liner comprised of a hardened substantially continuous layer of cement substantially impermeable to said corrosive fluids, which second cement liner lies along the inner surface of the outer well casing.

37. The apparatus defined in claim 36 wherein the well casings are of substantially equal thickness.

38. The apparatus defined in claim 36 wherein each cement liner comprises a thermally stable cement.

39. The apparatus defined in claim 38 wherein the first cement liner completely covers the outer surface of the outer well casing and the second cement liner completely covers the inner surface of the outer well casing.

40. The apparatus defined in claim 38 wherein the cement in each liner has an ultimate compressive strength of at least about 1,000 p.s.i.g. and permeability less than about one millidarcy.

41. The apparatus defined in claim 38 wherein the cement in each liner contains between about 40 and 80 percent of silica flour.

42. An apparatus comprising:
   (1) an essentially tubular metal casing;
   (2) an essentially tubular, continuous first concrete layer having permeability of not more than about 1 millidarcy surrounding and in contact with the outer surface of said metal casing; and
   (3) an essentially tubular, continuous second concrete layer having permeability of not more than about 1 millidarcy in contact with the inner surface of the metal casing.

43. An apparatus as defined in claim 42 wherein the outer surface of a second essentially tubular metal casing is in contact with the inner surface of the second concrete layer.

44. An apparatus as defined in claim 42 wherein the first and second concrete layers together completely envelop said tubular metal casing.

45. An apparatus as defined in claim 42 wherein said tubular metal casings are between about 100 and 20,000 feet long.

46. An apparatus as defined in claim 42 wherein said first and second concrete layers are thermally stable.

47. An apparatus as defined in claim 44 wherein all surfaces of the metal casing are in contact with a concrete layer.

48. An apparatus as defined in claim 42 wherein the first and second concrete layers are substantially equal in length to the metal casing.

49. An apparatus as defined in claim 33 wherein the inner and outer liners are of substantially equal thickness.

50. The process defined in claim 7 wherein the outer liner completely covers the outer surface of the outer well casing and the inner liner completely covers the inner surface of the outer well casing.

51. The process defined in claim 50 wherein the cement in steps (b) and (e), after hardening in steps (c) and (f) respectively, is thermally stable.

52. The process defined in claim 7, 50, or 51 wherein the cement in steps (b) and (e), after hardening in steps (e) and (f), respectively, comprises an API class G or J cement containing between about 40 and 80 percent of silica flour.

53. The process defined in claim 52 wherein the silica flour has a particle size less than about 10 mesh.

54. An apparatus comprising:
   (1) an essentially tubular metal casing;
   (2) an essentially continuous, tubular first concrete layer substantially impenetrable to geothermal brines, said layer surrounding and being in contact with the outer surface of said metal casing; and
   (3) an essentially continuous, tubular second concrete layer substantially impenetrable to geothermal brines, said layer being in contact with inner surface of the metal casing.

55. An apparatus as defined in claim 54 wherein the first and second concrete layers are thermally stable and together completely envelop said tubular metal casing.

56. An apparatus as defined in claim 54 or 55 wherein the first and second concrete layers have an ultimate compressive strength of at least about 1,000 p.s.i.g.

* * * * *